United States Patent [19]

Brown et al.

[11] 4,113,119

[45] Sep. 12, 1978

[54] APPARATUS FOR LOADING ARTICLES ONTO VERTICALLY SPACED HORIZONTALLY DISPOSED SHELVES

[75] Inventors: William L. Brown, Easton; Larry L. Reagan, Wind Gap, both of Pa.

[73] Assignee: SI Handling Systems, Inc., Easton, Pa.

[21] Appl. No.: 767,267

[22] Filed: Feb. 10, 1977

[51] Int. Cl.² ............................................. B65G 1/04
[52] U.S. Cl. ................... 214/16.4 A; 187/9 R; 187/92
[58] Field of Search .......... 214/16.4 A, 16.4 B; 187/2, 7, 8, 9 R, 76, 8.49, 92, 93

[56] References Cited

U.S. PATENT DOCUMENTS

| 292,265 | 1/1884 | Stoddard | 187/8 |
|---|---|---|---|
| 1,124,804 | 1/1915 | Remjas | 187/92 |
| 1,392,660 | 10/1921 | Sebestakowicz | 187/8 |
| 2,497,245 | 2/1950 | Vance | 187/92 |
| 3,402,835 | 9/1968 | Saul | 214/16.4 A |
| 3,406,846 | 10/1968 | O'Connor | 214/16.4 A |
| 3,490,616 | 1/1970 | Castaldi | 187/7 |
| 3,526,326 | 9/1970 | Castaldi | 214/16.4 A |
| 3,606,955 | 9/1971 | Saul | 214/16.4 A |
| 3,840,131 | 10/1974 | Castaldi | 214/16.4 A |

*Primary Examiner*—Evon C. Blunk
*Assistant Examiner*—Jeffrey V. Nase
*Attorney, Agent, or Firm*—Seidel, Gonda & Goldhammer

[57] ABSTRACT

An apparatus for loading articles onto horizontally and vertically spaced shelves includes a support mechanism movable parallel to an open end of the shelves. The support mechanism carries a loader, which is movable in a vertical direction. A mechanism is provided for aligning the loader with any one of the plurality of vertically spaced shelves.

9 Claims, 3 Drawing Figures

APPARATUS FOR LOADING ARTICLES ONTO VERTICALLY SPACED HORIZONTALLY DISPOSED SHELVES

BACKGROUND OF THE INVENTION

The apparatus of the present invention can be used for loading articles onto any arrangement of horizontally and vertically spaced shelves. In the preferred embodiment, the apparatus of the present invention is used in conjunction with an article dispensing apparatus such as disclosed in U.S. Pat. No. 3,348,732.

SUMMARY OF THE INVENTION

The apparatus of the present invention is used for loading articles onto horizontally and vertically spaced shelves. A support mechanism, which is movable parallel to an open end of the shelves, is supported adjacent to the shelves. A loading means, which is movable in the vertical direction, is carried by the support mechanism. A means for aligning the loading means with the shelves is provided.

The support mechanism in a preferred embodiment comprises a pair of vertically spaced carriages interconnected by a pair of rods. Each of the carriages supports rollers, which ride upon adjacent guide rails.

The loading means includes an angled member which is adapted to carry a row of articles to be loaded onto a shelf. The angled member is secured by bearings to the rods and is vertically slideable thereon.

A vertically extending hollow tube is supported by the lower carriage and carries a bracket. The bracket has the plurality of vertically spaced holes therethrough. The angled member carries a pin for selectively engaging one of the holes. The angled member can thereby be held rigidly at a plurality of vertically spaced points.

A counterweight mechanism is attached to the angled member and assists in the vertical movement of the loading mechanism. In operation, the angled member is aligned horizontally and vertically with a shelf to be loaded. The pin engages a hole in the bracket adjacent to the shelf to thereby secure the angle member in alignment with the shelf. Articles, such as bottles or boxes, can be arranged in a row on the angled member and thereafter slid onto the aligned shelf.

It is an object of the present invention to provide a loading mechanism for quickly and simply loading and reloading shelves.

It is another object of the present invention to provide a loading mechanism which is readily adjustable to a plurality of horizontal and vertical positions, wherein the loading mechanism can be aligned with any of a plurality of horizontally and vertically spaced shelves.

Other objects will appear hereinafter.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

DETAILED DESCRIPTION OF THE INVENTION

Figure 1:
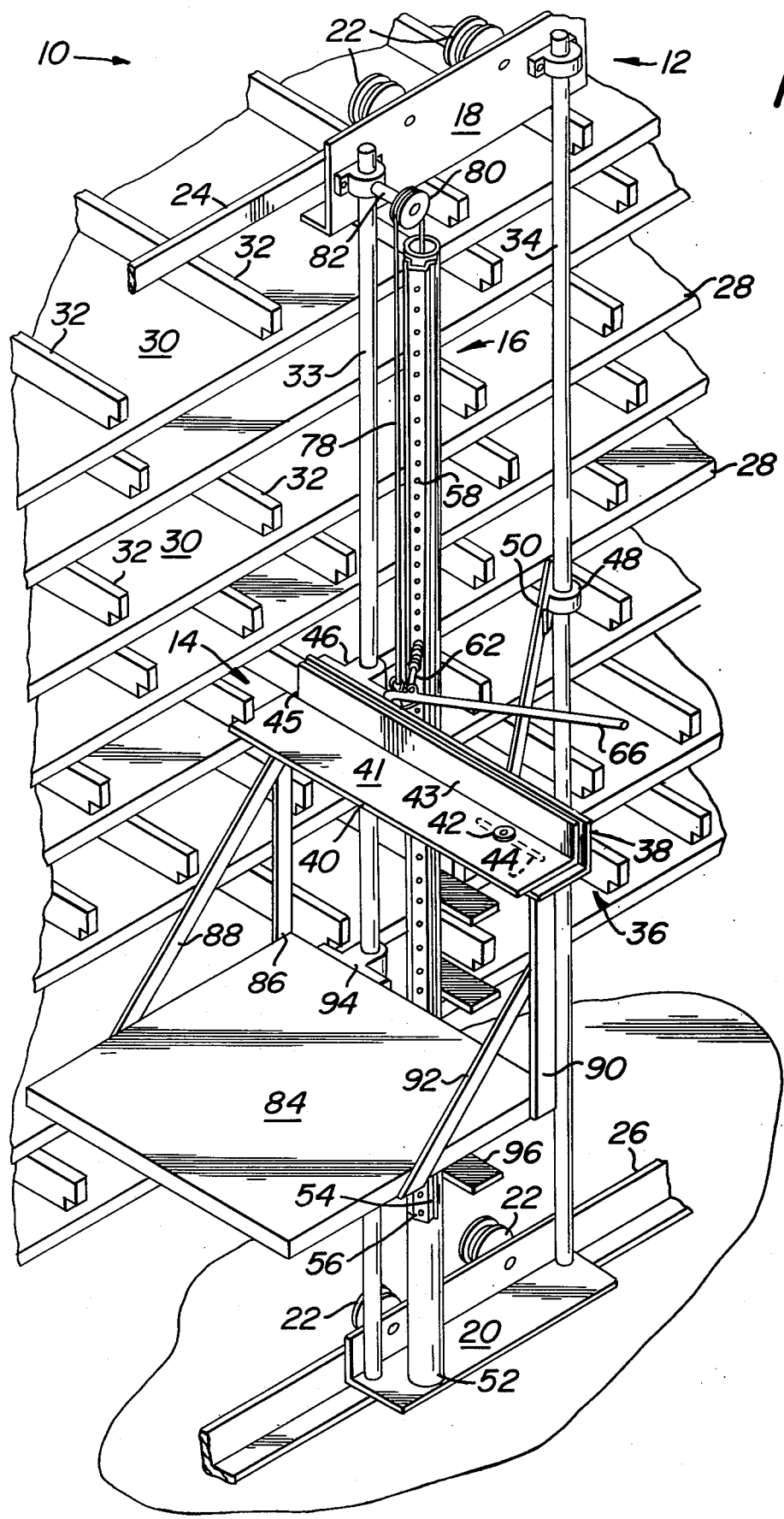
FIG. 1 is a perspective view of a loading mechanism in accordance with the present invention.
Figure 2:
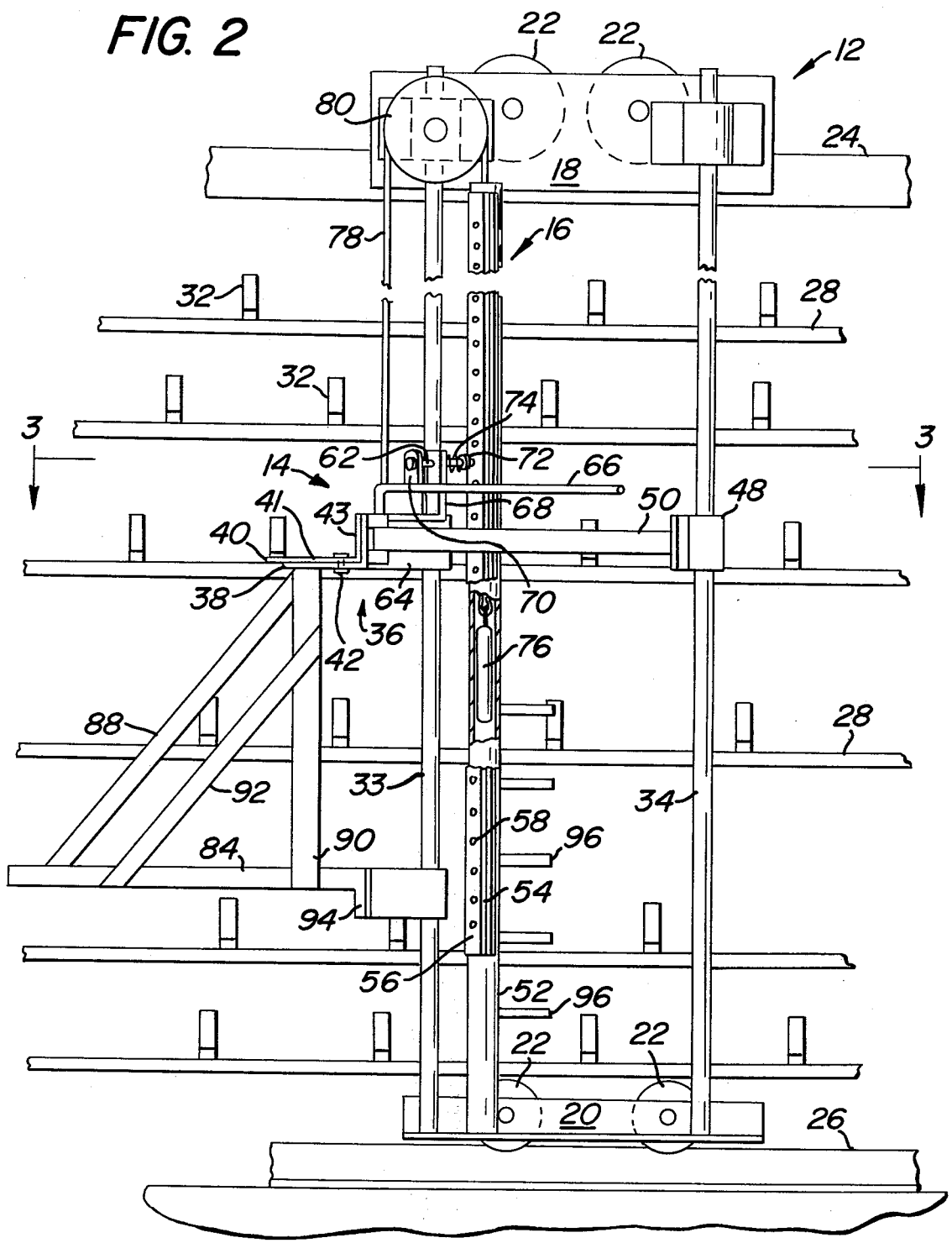
FIG. 2 is an elevational view of the loading mechanism.

Referring to the drawings in detail, wherein like numerals indicate like elements, there is shown in the FIG. 1 an apparatus in accordance with the present invention designated generally as 10. The apparatus 10 includes a support mechanism 12, which is movable in a horizontal direction. A loading mechanism 14 is slideably carried by the support mechanism 12 for vertical movement thereon. The loading mechanism 14 can be secured to mechanism 12 at a plurality of vertically spaced positions by an alignment mechanism 16.

The support mechanism 12 includes an upper carriage 18 and a lower carriage 20. Each carriage 18, 20 carries a pair of rotatable rollers 22. The rollers 22 on the upper carriage 18 engage an upper guide rail 24, while the rollers 22 on the lower carriage 20 engage a lower guide rail 26.

The guide rails 24, 26 are disposed adjacent the open ends of a plurality of horizontally spaced shelves 28. Each of the shelves is preferably divided into a plurality of lanes 30 by a plurality of dividers 32. The lanes 30 are designed to hold a plurality of various articles in aligned rows. Thus, for example, one lane 30 may contain a row of cereal boxes while another lane may contain a row of mouthwash or aspirin bottles. The loading mechanism 14 is provided to replenish the various lanes 30 with their respective articles which preferably will be selectively discharged from the ends of the lanes 30 opposite to the ends shown.

A pair of support rods 33, 34 extend between the upper carriage 18 and the lower carriage 20. The respective upper and lower ends of the rods 33, 34 are secured to the carriages 18, 20. The rods 33, 34 slideably support the loading mechanism 14.

The loading mechanism 14 includes an article support member 36. The member 36 is comprised of a lower angle plate 38 and an upper angle plate 40 slideably received thereon. The position of the upper angle plate 40 with respect to the lower angle plate 38 is adjustable in the lengthwise direction and can pivot slightly. This construction eliminates the need to precisely align the loading means with the selected shelf lane.

The upper angle plate 40 has a horizontally disposed base 41 and a wall 43 extending vertically therefrom. The base 41 extends further in the direction toward the shelves 28 than does the wall 43. A notch 45 is formed within the forward edge of base 41. A securing means, such as a nut and bolt 42 extends through a hole in the upper angle plate 40 and a slot 44 within the lower angle plate 38. The securing means and the upper angle plate 40 are thus slideable along the lengthwise dimension of slot 44. By sliding the plate 40 toward a shelf 28, the base 41 can be made to partially overlap a shelf 28 while the lower angle plate 38 is in abutting contact therewith. With the base 41 overlapping a shelf 28, the notch 45 is aligned with a divider 32. The wall 43 thus cooperates with a divider 32 to form a continuous surface against which the articles to be loaded can slide. The base 41 may be wider than some of the lanes 30. Therefore, in the preferred embodiment, the rearward end of dividers 32 are spaced from the surface of the shelves 28. The base 41 can therefore fit between the surface of a shelf 28 and the bottom of a divider 32.

Figure 3:
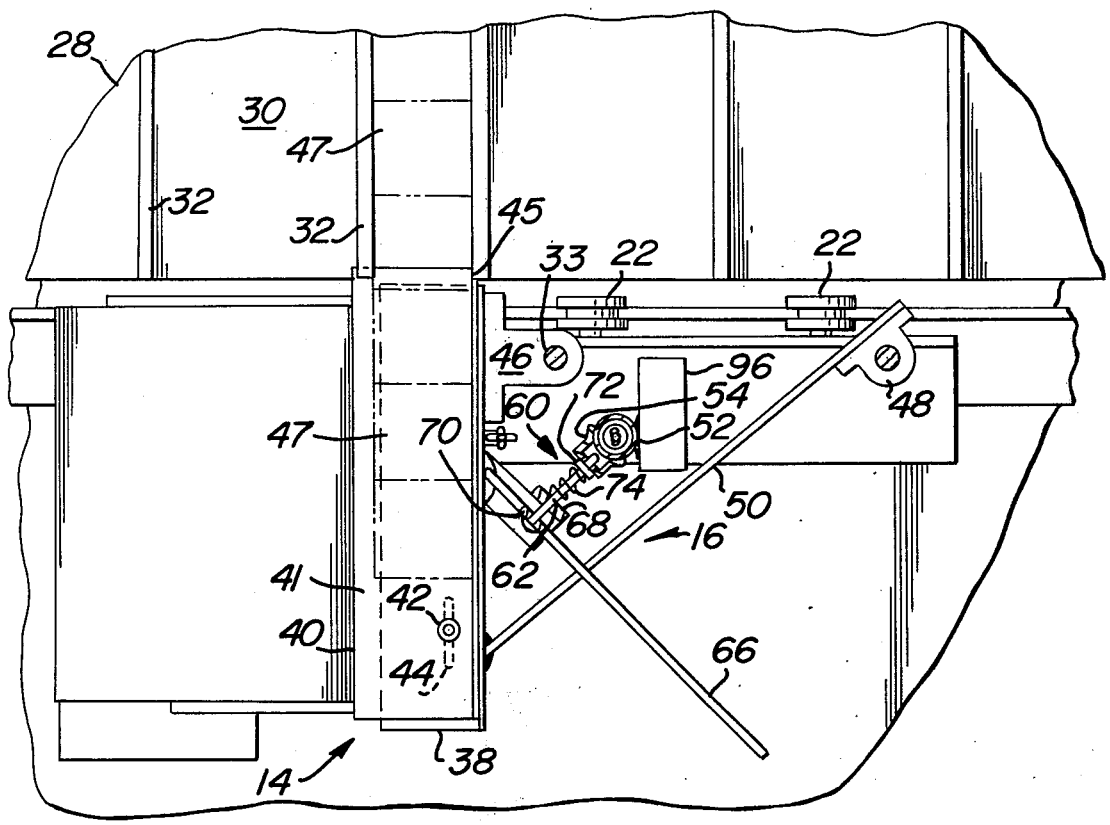
FIG. 3 is a view taken along lines 3—3 of FIG. 2.

After the base 41 has been positioned overlapping a shelf 28 and the notch 45 has been aligned with a divider 32, the relative positions between the upper angle plate 40 and the lower angle plate 38 is secured by tightening the securing means 42. In this manner, once a row of articles to be loaded has been arranged on the upper angle plate 40, all of the articles can be slid into a lane 30 without being caught at a gap between the loading mechanism and the shelf. A row of boxes 47 being slid into a lane 30 is shown in FIG. 3.

The member 36 is slideably received upon the rods 33, 34 by a pair of bearings 46, 48. The bearing 46 is attached directly to the lower angle plate 38 and is slideably received upon the rod 33, which is closest to the member 36. The bearing 48 is slideably received upon the rod 34. A connector 50 is secured at one of its ends to the bearing 48 and at its other end to the lower angle plate 38.

A hollow, vertically extending support member, such as a tube 52, is supported adjacent the rod 33 on the carriage 20. A bracket 54 is secured to the outer surface of the tube 52 and has a face 56 facing generally towards the member 36. The face 56 has a plurality of vertically spaced holes 58 therein.

A pin engaging mechanism 60 is pivotally carried by the angle member 38 and is designed to engage a pin 62 within a hole 58 after the member 36 has been aligned with a desired shelf 28. The pin engaging mechanism 60 includes a supporting arm 64 rigidly secured to the lower angle plate 38. The supporting arm 64 extends in the direction of the bracket 54. A handle 66 is journaled within the arm 64 and is pivotable about a vertical axis. A right angled bracket 68 is fastened to the top of supporting arm 64. The pin 62 is slideably supported within a hole of the angled bracket 68. One end of the pin 62 is attached to the handle 66 by a fastener 70, while the other end 62 is free to engage a hole 58. A stop 72 is fixedly secured to the pin 62 adjacent its free end. A spring 74 is carried by the pin 62 and has one of its ends abutting the angled bracket 68 and its other end abutting the stop 72. The spring 74, thus, biases the pin 62 in the direction of bracket 54. When the pin 62 is aligned with a hole 58, the spring 74 provides a bias force to secure the pin 62 within the hole 58.

When it is necessary to change the vertical position of the loading mechanism, the handle 66 is rotated in a clockwise direction, as seen in FIG. 3. The handle 66 thereby pulls the pin 62 against the bias of spring 74 and disengages the pin 62 from a hole 58. The loading mechanism 14 can now be moved to a new vertical position and the pin 62 engaged into a new hole 58.

To assist in the vertical movement of the loading mechanism 14, a counterweight 76 is utilized. The counterweight 76 is attached to one end of a cable 78, while the other end of the cable 78 is attached to the member 36. The cable 78 extends vertically upward from its point of attachment to the member 36, passes around a pulley 80 and thereafter descends vertically into the hollow tube 52. The counterweight 76 is thus guided by and moved within the hollow tube 52. The pulley 80 is rotatably carried by a rod 82 which is secured to the upper carriage 18.

A platform 84 is supported below the member 36 by braces 86, 88, 90, 92. A bearing 94, which slides along the rod 33, is also secured to the platform 84. The platform 84 provides support for boxes containing the various articles to be loaded. Steps 96 are pivotally attached to the tube 52. The steps 96 can be pivoted about a vertical axis from an inoperative position shown in the drawings to an operative position. In the operative position, the steps 96 extend under the loading mechanism 14. Thus, when loading the uppermost shelves 28, the person performing the loading operation can pivot the steps 96 into their operative position and stand upon one of the steps 96.

The drawings illustrate one form of steps which can be utilized with the loading apparatus 10. However, any steps which can be moved from a position which permits the vertical movement of the loading mechanism 14 to a position extending beneath the loading mechanism 14 can be utilized.

In operation, boxes of the various articles to be loaded are placed upon the platform 84. The support mechanism 12 is moved along the guide rails 24, 26, until member 36 is vertically aligned with a lane 30, which is to be loaded. The handle 66 is thereafter rotated in a clockwise direction to disengage the pin 62 from a hole 58 and the entire loading mechanism 14 is moved vertically, until member 36 is horizontally aligned with the lane 30 which is to be loaded. With member 36 so aligned, the handle 66 is allowed to rotate in a counterclockwise direction and the spring 74 biases the pin 62 into engagement with a hole 58. If a gap exists between the lane 30 and the upper angle plate 40, the upper angle plate 40 is slid and/or pivoted toward the lane 30 to a position where the base 41 overlaps the edge of the lane 30 and the notch 45 aligns with the adjacent divider 32. The nut and bolt 42 is thereafter tightened to secure the upper plate 40 in position.

The articles to be loaded are removed from the boxes and placed in a row upon the upper angle plate 40. Thereafter, the articles are simultaneously slid into the lane 30. Depending on the length of the lanes 30 and the length of plate 40, a whole lane 30 may be replenished at one time. The row of articles can be slid from the upper angle plate 40 into a lane 30 either manually by a person pushing the rearmost article toward the lane 30 or by a suitable mechanical means pushing the rearmost article. A suitable mechanical means could be, for example, a driven piston rod. The above-described operation is thereafter repeated for all the lanes 30, which are to be loaded.

The present invention may be embodied in other specific forms without departing from the spirit or essential attributes thereof and, accordingly, reference should be made to the appended claims, rather than to the foregoing specification as indicating the scope of the invention.

What is claimed is:

1. Apparatus comprising vertically spaced horizontally disposed shelves, said shelves having a discharge end and a replenishment end, a device adjacent the replenishment end of said shelves for loading articles onto said shelves, said device being guided by guide rails for reciprocating along the replenishment end of said shelves, said device including a pair of carriages spaced vertically from one another, each carriage having rollers for rolling engagement with one of said guide rails, at least one vertical member interconnecting said carriages, an article support surface, means supporting said article support surface so that the support surface may be manually moved relative to its support means to a position so that it partially overlies a replenishment end of one of said shelves, said surface support means being coupled to said vertical member for guided vertical movement by said vertical member, a hollow vertical member connected to one of said carriages and having a counterweight therein, the counterweight being connected to said surface support means by way of a cable extending around at least one pulley at the upper end of said device, said device having at least one case support shelf for supporting a case of articles prior to transfer of the articles from the case to said article support surface and for subsequent loading onto said shelves.

2. Apparatus in accordance with claim 1 wherein said device includes steps onto which an operator can stand when replenishing articles onto the replenishment end of the uppermost of said shelves.

3. Apparatus in accordance with claim 1 wherein said shelves include a plurality of dividers, each divider extending substantially from said replenishment end to said discharge end whereby a plurality of lanes are formed on said shelves.

4. Apparatus in accordance with claim 3 wherein said article support surface includes a vertically extending wall forming a guide surface for alignment with a divider on a shelf to thereby form a continuous surface with said last-mentioned divider against which a row of articles being loaded can slide.

5. Apparatus adapted to be positioned adjacent the replenishment end of shelves for loading articles onto said shelves comprising a device guided for reciprocation by horizontal guide rails, said device including a pair of carriages spaced vertically from one another, each carriage having rollers for rolling engagement with one of said guide rails, at least one vertical member interconnecting said carriages, an article support surface, means supporting said article support surface so that the support surface may be manually moved relative to its support means to a position so that it can partially overlie a replenishment end of a shelf, said surface support means being coupled to said vertical member for guided vertical movement by said vertical member, a hollow vertical member connected to one of said carriages and having a counterweight therein, the counterweight being connected to said surface support means by way of a cable extending around at least one pulley at the upper end of said device, said device having at least one case support shelf for supporting a case of articles prior to transfer of the articles from the case to said support surface and for subsequent loading onto shelves.

6. Apparatus in accordance with claim 5 wherein said apparatus includes steps onto which an operator can stand when replenishing articles onto the replenishment end of the uppermost shelves.

7. Apparatus in accordance with claim 6 wherein said case support shelf is connected to and supported by at least one of said vertical members.

8. Apparatus in accordance with claim 5 wherein said article support surface includes a vertically extending wall forming a guide surface against which a row of articles to be loaded can slide.

9. Apparatus adapted to be positioned adjacent the replenishment end of shelves for loading articles onto said shelves comprising a device guided for reciprocation by horizontal guide rails, said device including a pair of carriages spaced vertically from one another, each carriage having rollers for rolling engagement with one of said guide rails, and article support surface, means supporting said article support surface so that the support surface may be manually moved in a horizontal direction, a pair of vertical members interconnecting said carriages, said surface support means being coupled to one of said vertical members for guided vertical movement by said one vertical member, said device having at least one case support shelf for supporting a case of articles prior to transfer of the articles from the case to said support surface and for subsequent loading onto shelves, said case support shelf being supported at least in part by said other vertical member, and said article support surface including a vertically extending wall forming a guide surface against which a row of articles to be loaded can slide.

* * * * *